(12) United States Patent
Bour et al.

(10) Patent No.: US 11,854,740 B2
(45) Date of Patent: Dec. 26, 2023

(54) CAPACITOR BLOCK HAVING A SPACER

(71) Applicant: Valeo Siemens eAutomotive France SAS, Cergy (FR)

(72) Inventors: Stephane Bour, Cergy (FR); Olivier Gilet, Cergy (FR)

(73) Assignee: Valeo Siemens eAutomotive France SAS, Cergy (FR)

( * ) Notice: Subject to any disclaimer, the term of this patent is extended or adjusted under 35 U.S.C. 154(b) by 0 days.

(21) Appl. No.: 17/601,294

(22) PCT Filed: Apr. 3, 2020

(86) PCT No.: PCT/EP2020/059631
§ 371 (c)(1),
(2) Date: Oct. 4, 2021

(87) PCT Pub. No.: WO2020/201536
PCT Pub. Date: Oct. 8, 2020

(65) Prior Publication Data
US 2022/0208450 A1    Jun. 30, 2022

(30) Foreign Application Priority Data
Apr. 5, 2019  (FR) ..................... 1903709

(51) Int. Cl.
*H01G 2/04* (2006.01)
*H01G 2/10* (2006.01)
*H01G 11/82* (2013.01)

(52) U.S. Cl.
CPC ............ *H01G 2/04* (2013.01); *H01G 2/10* (2013.01); *H01G 2/106* (2013.01); *H01G 11/82* (2013.01)

(58) Field of Classification Search
CPC ............ H01G 2/10; H01G 2/106; H01G 2/04; H01G 4/224; H01G 4/38; H01G 11/08; H01G 11/18
See application file for complete search history.

(56) References Cited

U.S. PATENT DOCUMENTS

2018/0316071 A1    11/2018  Newman et al.
2020/0067418 A1*    2/2020  Daneels ............... H02M 7/003

FOREIGN PATENT DOCUMENTS

DE      102012205310 A1    10/2013
EP          3197035 A1     7/2017
(Continued)

OTHER PUBLICATIONS

International Search Report and Written Opinion issued in corresponding International Patent Application No. PCT/EP2020/059631, dated Jul. 16, 2020 (12 pages).
(Continued)

*Primary Examiner* — Eric W Thomas
(74) *Attorney, Agent, or Firm* — Osha Bergman Watanabe & Burton LLP

(57) ABSTRACT

A capacitive block for electrical equipment includes a housing, at least one capacitive element having a first end housed in the housing and a second end, which is opposite to the first end and which extends out of the housing, an end-stop being fixed to the second end of the at least one capacitive element, and at least one spacer, which butts against the end-stop, so as to determine the distance between the second end of the at least one capacitive element and a bottom of the housing.

12 Claims, 3 Drawing Sheets

(56) References Cited

FOREIGN PATENT DOCUMENTS

| | | |
|---|---|---|
| JP | 2013-069966 A | 4/2013 |
| JP | 2014-229725 A | 12/2014 |
| JP | 2015-509289 A | 3/2015 |
| JP | 2018-182066 A | 11/2018 |
| WO | 2012105496 A1 | 8/2012 |
| WO | 2013113691 A1 | 8/2013 |
| WO | WO-2020187491 A1 * | 9/2020 ............... H01G 2/04 |

OTHER PUBLICATIONS

Office Action Issued in Corresponding JP Application No. 2021-560518; dated Aug. 1, 2023. (24 Pages with English Translation).

* cited by examiner

CAPACITOR BLOCK HAVING A SPACER

TECHNICAL FIELD AND SUBJECT MATTER OF THE INVENTION

The present invention relates to a capacitive block, notably for electrical equipment, for example carried on board a motor vehicle. Such electrical equipment may be an inverter, a voltage converter or an electric battery charger.

PRIOR ART

As is known, in a capacitive block, a capacitive element may be placed inside a casing and embedded in a potting material which chiefly has the function of holding the capacitive element and protecting it against moisture. Such a potting material generally comes in the form of a resin. The capacitive element is made up for example of films wound around the terminals of the capacitor. Typically, the capacitive element is fully embedded in the resin so that the outside of the capacitive block is formed by external walls of the casing and one face formed by the resin. Only electrical terminals extend out of the resin from said face. However, in certain applications, particularly in electric vehicles, there is a desire to reduce the size of the electronic components. Now, in this capacitive-block structure, the casing and the resin take up what may be a not-insignificant amount of space. Furthermore, it is necessary to leave a space between the capacitive element and the lateral walls of the casing in order to allow the resin to flow.

A capacitive block in which the casing extends over a height that is smaller than the height of the capacitive element is known. The casing then forms a dish that is just big enough to receive resin at one end of the capacitive block that comprises the electrical connection between an electrical terminal of the capacitive block and an electrode of the capacitive element.

However, the capacitive elements of the one same model may have different heights because of uncertainties inherent to the way in which they are manufactured. Thus, within the one same capacitive block, the capacitive elements may have different heights. Furthermore, in an industrial manufacturing process, from one capacitive block to another the capacitive elements may have different heights, and this has an impact on the repeatability of the dimensions of the capacitive blocks manufactured. This is particularly important in electrical equipment in which the capacitive block has to be cooled in order to dissipate the heat emitted when the capacitive block is being powered with electrical energy. To that end, the electrical equipment is generally provided with a cooling circuit. In order to optimize the dissipation of heat, one entire face of the capacitive block has to be pressed intimately against said cooling circuit. Now, a difference in height between the capacitive elements of the capacitive block may fail to allow the face of the capacitive block to be intimately pressed against the cooling circuit uniformly. If, in spite of everything, measures are taken to ensure that the heights within one capacitive block are uniform, a difference between capacitive blocks of the same model may lead to disturbances in the string of dimensions of the electrical equipment which comprises the capacitive block. A height specific to each capacitive block is not suited to industrial-scale manufacture.

There is therefore still a need for a capacitive block of limited bulkiness, but which maintains a certain degree of flexibility with regard to uncertainties in the manufacture of the capacitive elements.

GENERAL DESCRIPTION OF THE INVENTION

To this end, the present invention relates to a capacitive block, notably for electrical equipment, comprising a housing; at least one capacitive element having a first end housed in said housing and a second end, which is opposite to the first end and which extends out of said housing; an end-stop, said end-stop being fixed to the second end of the capacitive element; at least one spacer, which butts against said end-stop, so as to determine the distance between the second end of the capacitive element and a bottom of said housing.

Thus, the spacer supports said capacitive element with respect to the bottom of said housing. The height of the capacitive block between the bottom of the housing and the second end of the capacitive element is set by the spacer, which means that the height of the capacitive block is controlled, despite the uncertainty regarding the height of the capacitive elements. The bottom is, for example, a wall of the housing, notably a peripheral wall, which faces the first end of the capacitive element.

According to one embodiment of the invention, a potting material, notably a resin, at least partially fills said housing so as to seal the capacitive element at the first end of the capacitive element. According to a variant, the potting material is an electrical insulator and thus provides electrical insulation of the first end with respect to the housing that accepts the first end.

The resin exhibits numerous characteristics which are advantageous to its use in a capacitive block. In particular, the resin is fluid during the filling of the housing. The fluidity allows the resin to be distributed uniformly in the housing, between the capacitive elements, the connections of the capacitive elements. The resin is cured (hardened) by heating, and effectively polymerizes. Therefore, after the polymerization step, the resin becomes solid. Such polymerization can be achieved by heating in an oven. In this way, the resin surrounds one end of the capacitive element, sealing this end. Furthermore, the polymerized resin renders the bottom of the housing rigid and solid, which allows effective abutment via an external face of the bottom when the capacitive block is pressed intimately against a heat sink.

In a variant, the second end of the capacitive element extends out of said potting material. Just part of the capacitive element lies in the housing.

According to one embodiment of the invention, the housing is formed by the bottom and a lateral wall extending from said bottom, delimiting an internal volume of said housing. The bottom of the housing comprises the end of the capacitive element and at the same time acts as an electrical insulator between the capacitive element and the elastic member. Notably, the lateral wall extends toward the second end of the capacitive element.

In a variant, the lateral wall stops short of the second end of the capacitive element. The housing therefore comprises only the first end of the capacitive element. The lateral wall notably stops at a height of less than half, or even than one third or than one quarter of the height of the capacitive element. The size of the housing is therefore reduced, and so the bulkiness of the capacitive block is therefore likewise reduced.

In a variant, for rapid and uniform filling which are advantageous for an industrial-scale manufacturing process, the lateral wall of the housing may be outwardly inclined. What that means to say is that the area delimited by the edge of the lateral wall, notably in a plane parallel to the bottom of the housing, this area is greater than the area of the bottom of the housing. The space occupied by the capacitive block is at least partially dependent on the extent of the lateral walls of the housing. The smaller the extent to which the lateral walls extend, the less space is taken up by the capacitive block. Nevertheless, in this variant, it is preferable to ensure at least a minimum extent so as to allow the sealing of the first end of the capacitive element, which end is embedded in the potting material.

In one variant, the potting material extends to a height less than the height of said lateral wall. In particular, this makes the capacitive block before polymerization easier to handle, because the risk of an overspill is reduced.

According to one embodiment of the invention, the spacer extends from the bottom of the housing.

In one embodiment of the invention, the capacitive block comprises at least two spacers, which are uniformly distributed over the bottom of the housing. This then ensures that the points at which the spacers and the end-stop butt against one another are uniformly distributed. That avoids the capacitive element being unbalanced with respect to the spacers. Such imbalance could cause the capacitive element to tilt, and therefore cause an external face of the capacitive block, at the second end of the capacitive element, not to be parallel with respect to the bottom of the housing. This would be particularly detrimental when the capacitive block was being intimately pressed against a heat sink. Such intimate pressing is achieved for example by the pressing of a stressed elastic member against the external face of the bottom of the housing in order to butt the opposite external face of the capacitive block against a heat sink. The dissipation of heat resulting from the intimate pressing of the capacitive block against the heat sink is optimal when the plane of the intimately pressing surface is parallel to the surface pushed by the elastic member. The at least two spacers determine an equal distance between the end-stop and the bottom of said housing at every point on the end-stop. They therefore contribute toward keeping the end-stop parallel to the bottom of the housing. The spacers may encourage uniform distribution of the intimate-pressing force that is applied by the elastic member.

According to one embodiment of the invention, the spacer has a cylindrical or conical shape.

In one embodiment of the invention, the first end of the capacitive element comprises a first electrode of the capacitive element, and the capacitive block comprises a first electrical terminal pressing against said first electrode so as to connect electrically to the first electrode, said first electrical terminal comprising at least one opening through which said spacer passes. The opening in the first electrical terminal allows for a space saving. Specifically, it is then unnecessary to provide in the bottom of the housing an overhang around the first electrical terminal. Such an overhang would have received the spacer to make it extend toward the end-stop by passing beside the first electrical terminal. Thanks to the opening in the first electrical terminal, it is possible to dispense with such an overhang, thereby reducing the bulkiness of the capacitive block. The opening may have various shapes. It may consist of a hole of any possible shape. The opening may be a notch formed from one edge of the first electrical terminal. The opening may be obtained by cutting-out or any other means. The opening allows the spacer to pass so that it can butt against the end-stop.

According to one embodiment of the invention, the end-stop comprises a second electrical-connection electrical terminal of the capacitive block, said second electrical terminal pressing against a second electrode of the capacitive element so as to connect electrically to said second electrode of the capacitive element. In a variant, said second electrode is comprised in the second end of the capacitive element.

According to a variant, the electrical connection between the second electrical terminal and the second electrode of the capacitive element is obtained by metal spraying. The metal-spraying operation notably consists in obtaining, by spraying metal, a mechanical connection and an electrical contact between the electrode of the capacitive element and the corresponding electrical terminal.

In a variant, the electrical connection, notably the electrical connection obtained by metal spraying, between the second electrical terminal and the second electrode of the capacitive element is covered with a lacquer so as to seal said electrical connection. Notably, the lacquer is spread over the entirety of the second end of the capacitive element. The lacquer provides sealing at the second end without being bulky. The lacquer is, for example, a silicone lacquer.

Notably, the first or the second electrical terminal may be a conducting plate or sheet. In particular, the first or the second electrical terminal provides the connection of the capacitive element with an element external to the capacitive block.

The invention also relates to a method for assembling a capacitive block, comprising the steps consisting in:
  providing a capacitive element having a first end and a second end which are opposite ends, an end-stop being fixed to the second end,
  mounting said capacitive element in a housing via its first end so that the second end is outside said housing,
  said mounting step involving butting at least one spacer against said end-stop, so as to determine the distance between the second end of the capacitive element and a bottom of said housing. Thus, the manufacture and use of an expensive, complicated or bulky tool is avoided.

According to one embodiment, the method comprises the steps consisting in:
  at least partially filling the housing with a fluid potting material, so as to at least partially, if not completely, fill up the space between the capacitive element and a peripheral wall of the housing;
  curing the potting material, notably by heating, particularly so as to fix the capacitive element in the casing.

In this way, the capacitive element is fixed in the housing and the first end of the capacitive block is sealed, with the capacitive block having a limited bulkiness.

PRESENTATION OF THE FIGURES

The invention will be better understood in light of the following illustrations:

Figure 1:
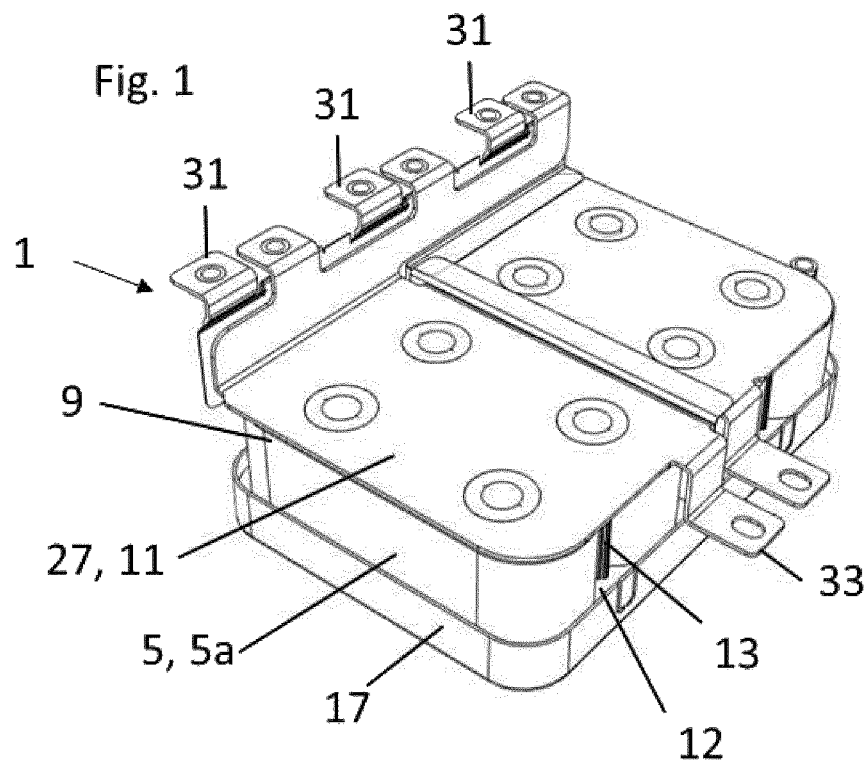
FIG. 1 shows a capacitive block according to one exemplary embodiment of the invention.

FIG. 1 shows a capacitive block 1 according to one exemplary embodiment of the invention. The capacitive block 1 is provided with a casing 14. This casing 14 forms a housing 3. The casing 14 notably comprises a bottom 15 and a lateral wall 17 which extends from the bottom 15. The bottom 15 and the lateral wall 17 delimit an internal volume of the housing 3. The casing 14 accepts, into the housing 3, a first end 7 of the capacitive element 5. The first end 7 is notably embedded in a potting material 12, such as resin, contained in said internal volume.

Figure 5:
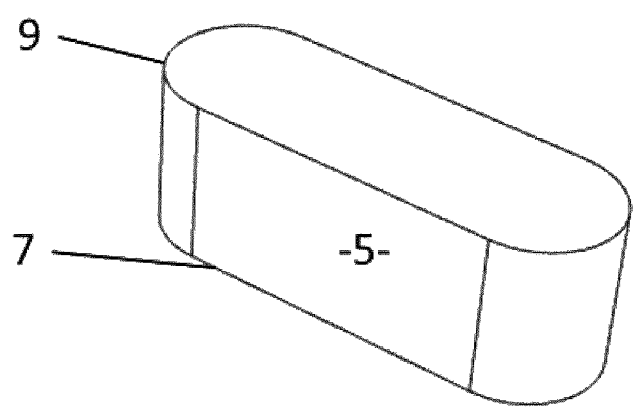
FIG. 5 shows a capacitive element of the capacitive block.

In the example illustrated, four capacitive elements 5 are arranged side-by-side in the housing 3. In what follows, the example will be described with reference to just one 5a of the capacitive elements 5, the description readily applying to the other capacitive elements 5. One example of a capacitive element 5 is illustrated in FIG. 5. The capacitive element 5 is notably provided with a first electrode formed by its first end 7, and with a second electrode, of opposite polarity, formed by the second end 9 which is the opposite end to the first end 7. Alternatively, the capacitive element 5 could have its electrodes together on a single end 7, 9. The capacitive element 5 is, for example, a film capacitor. The exterior curvature of the capacitive element 5 then stems from the method of manufacture of the capacitive element: the capacitive element 5 notably consists of films wound in the form of a flattened cylinder, the ends of the cylinders forming the electrodes of the capacitor, notably following a metallization step.

The first end 7 of the capacitive element 5 is embedded in the potting material 12 contained in the housing 3. The second end 9 of the capacitive element 5 extends out of the housing 3. An end-stop 11 is fixed to the capacitive element 5 on the second end 9 of the capacitive element 5. Spacers 13 extend from the bottom 15 of the housing 3 to butt against the end-stop 11 so as to determine the distance between the second end 9 of the capacitive element 5 and the bottom 15 of the housing 3. The example illustrated comprises four spacers 13, but in what follows, the example will be described with reference to the two spacers 13a, 13b relating to the capacitive element 5a, the description being readily applicable to the other capacitive elements 5 and the corresponding spacers 13 thereof.

In particular, the capacitive block 1 comprises a first electrical terminal 23 configured to connect the capacitive element 5 with an external element. In particular, the first electrical terminal 23 butts against the first end 7 for electrical contact with the first electrode of the capacitive element 5. For this purpose, the first electrical terminal 23 notably comprises tongues 23L which are soldered to the first electrode of the capacitive element 5. The first electrical terminal 23 further comprises openings 25 via which the spacers 13 pass in order to butt against the end-stop 11.

Figure 4:
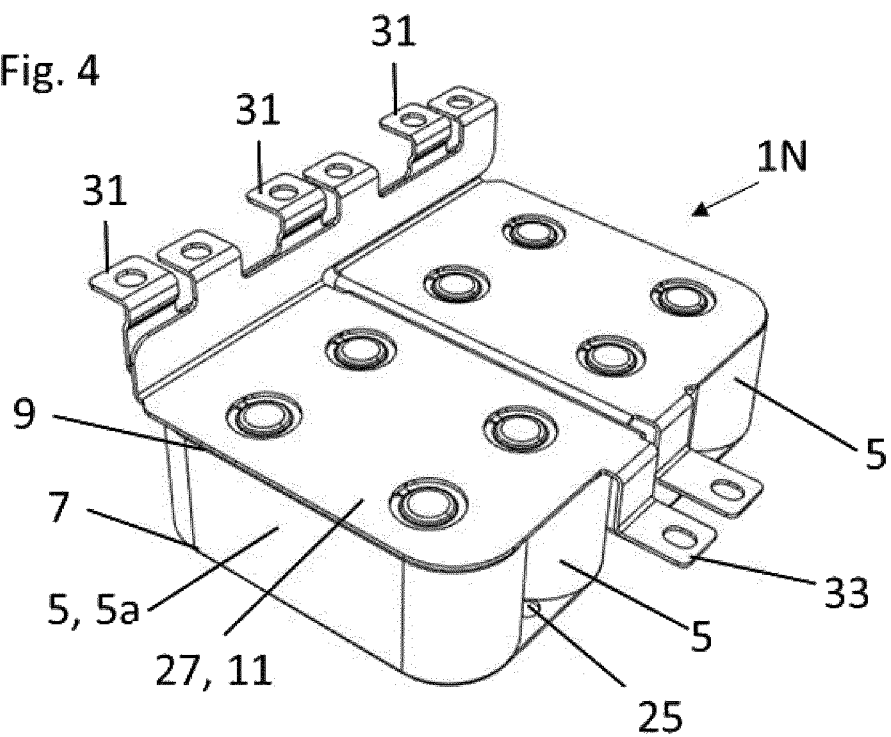
FIG. 4 shows the capacitive block of FIG. 1 without the casing.

The capacitive element 5 is equipped with the first electrical terminal 23 and with the end-stop 11 to form a bare capacitive block 1N, namely a capacitive block 1 without a casing 14, for example as depicted in FIG. 4. The bare capacitive block 1N is then mounted in the housing 3 of the casing 14. During this mounting, the first end 7 of the capacitive block 5 is introduced into the casing 14 such that the spacers 13 enter the openings 25 of the first electrical terminal 23. The introduction of the capacitive element 5 into the casing 14 is halted by contact between the tops of the spacers 13 and the end-stop 11. The positioning of the spacers 13 in the casing 14 is designed to correspond to the locations of the openings 25. However, the spacers 13 are situated in the empty space between the capacitive elements 5 and the edge of the bottom 15 of the housing 3, which is to say, in particular, between the capacitive elements 5 and the lateral wall 17. Thus, once mounted in the housing 3, the bare capacitive block 1N is supported by the spacers 13. In particular, there remains a space between the bottom 15 of the housing 3 and the first electrical terminal 23. In other words, the capacitive element 5 equipped with the first electrical terminal 23 is kept suspended by the spacers 13.

In particular, the lateral wall 17 of the casing 14 extends to a height that allows the potting material 12 to encapsulate the first electrical terminal 23 and the first end 7 of the capacitive element 5.

The end-stop 11 notably comprises a second electrical-connection terminal 27 of the capacitive block 5. Like the first electrical-connection terminal 23, the second electrical-connection terminal 27 is in particular configured to connect the capacitive element 5 with an external element. For this purpose, the second electrical-connection terminal 27 butts, on the second end 9 of the capacitive element 5, against the second electrode of the capacitive element 5, which electrode is notably formed by the second end 9. In particular, a lacquer is spread over the entirety of the second end 9 of the capacitive element 5 to create sealing at the second end 9.

In particular, the first electrical-connection terminal 23 comprises ends 31 which are intended to provide a connection with a power electronics module. In particular, the second electrical-connection terminal 27 comprises ends 33 which are intended to provide a connection with an electrical power supply, notably a battery.

Figure 2:
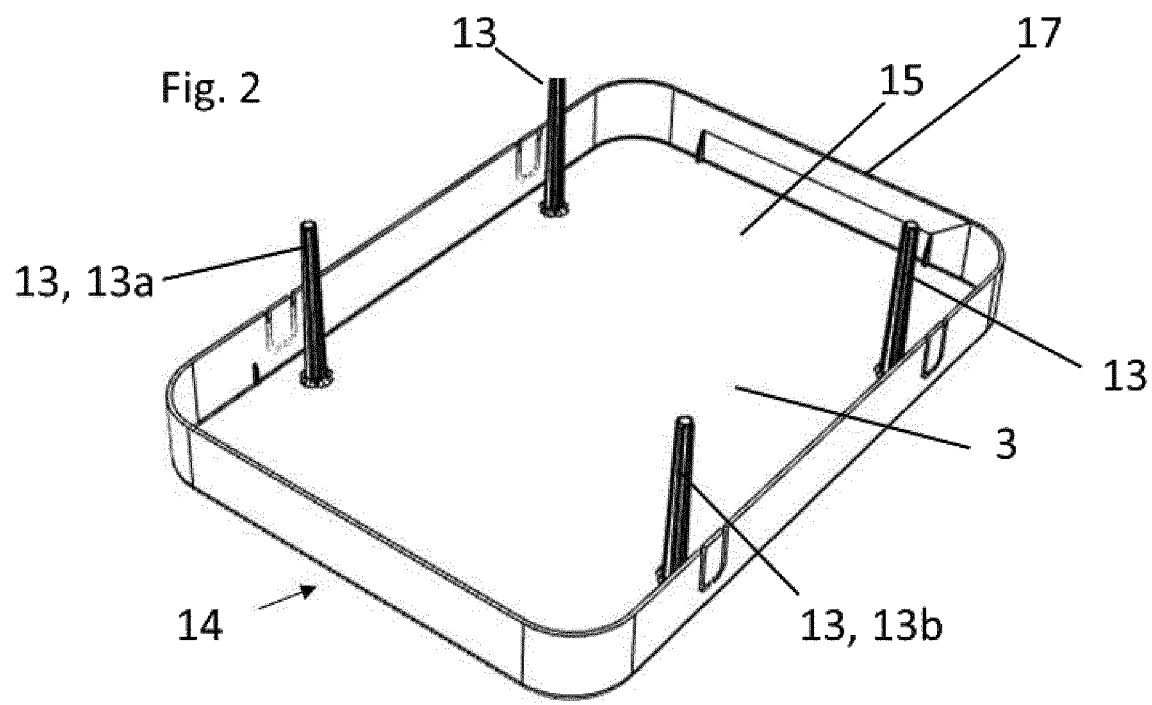
FIG. 2 shows a casing that forms a housing of the capacitive block of FIG. 1.
Figure 3:
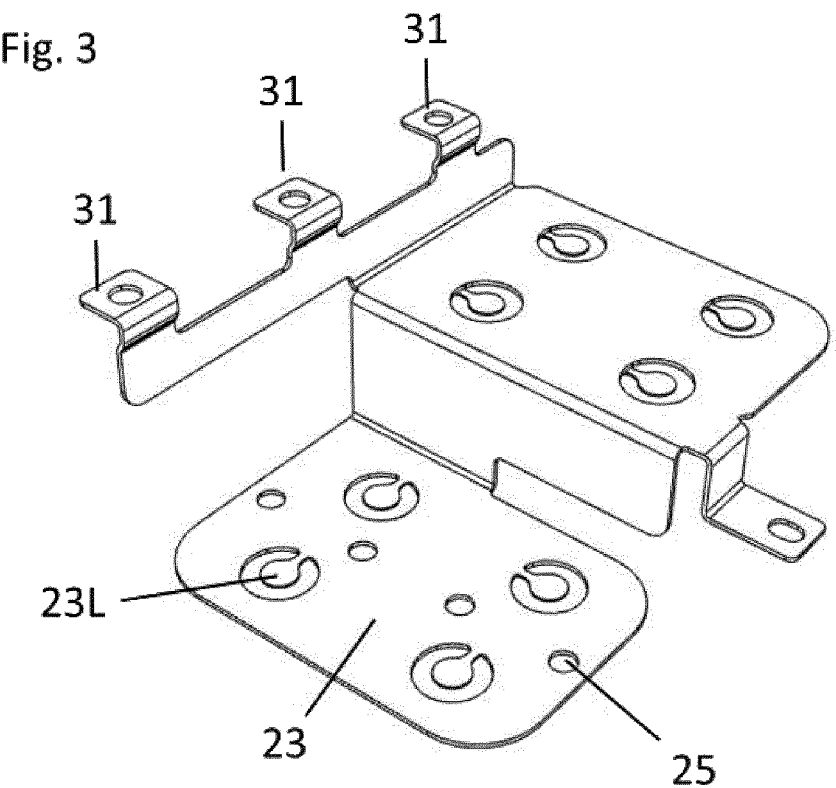
FIG. 3 shows an electrical terminal of the capacitive block of FIG. 1.

As visible in FIG. 2, the spacers 13 are uniformly distributed over the bottom 15 so as to provide stable retention of the end-stop 11 and therefore of the capacitive elements 5.

The spacers 13 notably have a conical shape of polygonal cross section. However, they could have a different shape, for example the shape of a rod that is cylindrical, conical or of rounded cross section. A shape that tapers towards the end-stop 11 combines the advantage of a firm base with ease of passage during mounting.

The example of capacitive block 1 described is in other respects similar to the one described in the publication of European patent application EP3197035, the description of which is incorporated into the present application.

The invention claimed is:

1. A capacitive block for electrical equipment, comprising:
    a housing;
    at least one capacitive element having a first end housed in said housing and a second end, which is opposite to the first end and which extends out of said housing;
    an end-stop, said end-stop being fixed to the second end of the at least one capacitive element; and
    at least one spacer, which butts against said end-stop, so as to determine the distance between the second end of the at least one capacitive element and a bottom of said housing.

2. The capacitive block as claimed in claim 1, wherein a potting material comprising a resin at least partially fills said housing so as to seal the at least one capacitive element at the first end of the at least one capacitive element.

3. The capacitive block as claimed in claim 2, wherein the second end of the at least one capacitive element extends out of said potting material.

4. The capacitive block as claimed in claim 1, wherein said at least one spacer extends from the bottom of the housing.

5. The capacitive block as claimed in claim 1, comprising another spacer, and wherein said at least one spacer and the other spacer are uniformly distributed on the bottom of the housing.

6. The capacitive block as claimed in claim 1, wherein said at least one spacer has a cylindrical or conical shape.

7. The capacitive block as claimed in claim 1, wherein the first end of the at least one capacitive element comprises a first electrode of the at least one capacitive element, and the capacitive block comprises a first electrical terminal pressing against said first electrode so as to connect electrically to the first electrode, said first electrical terminal comprising at least one opening through which said at least one spacer passes.

8. The capacitive block as claimed in claim 1, wherein said housing is formed by the bottom and a lateral wall extending from said bottom, delimiting an internal volume of said housing.

9. The capacitive block as claimed in claim 1, wherein said end-stop comprises a second electrical-connection terminal of the capacitive block, said second electrical terminal pressing against a second electrode of the at least one capacitive element so as to connect electrically to said second electrode of the at least one capacitive element.

10. A method for assembling a capacitive block, comprising:
   providing a capacitive element having a first end and a second end which are opposite ends, an end-stop being fixed to the second end;
   mounting said capacitive element in a housing via the first end so that the second end is outside said housing,
   wherein mounting comprises butting at least one spacer against said end-stop, so as to determine a distance between the second end of the capacitive element and a bottom of said housing.

11. The assembly method as claimed in claim 10, further comprising:
   connecting a first electrical terminal of the capacitive block to a first electrode of the capacitive element, wherein the first electrode of the capacitive element is comprised in the first end, and
   connecting a second electrical terminal of the capacitive block to a second electrode of the capacitive element, wherein the second electrode of the capacitive element is comprised in the second end, said second electrical terminal being comprised in said end-stop, and
   wherein the mounting further comprises passing the at least one spacer through an opening in the first electrical terminal so that it butts against said end-stop.

12. The assembly method as claimed in claim 11, further comprising:
   at least partially filling the housing with a fluid potting material, so as to at least partially, if not completely, fill up the space between the capacitive element and a peripheral wall of the housing; and
   curing the potting material by heating.

* * * * *